US011034319B2

(12) United States Patent
Spencer

(10) Patent No.: US 11,034,319 B2
(45) Date of Patent: Jun. 15, 2021

(54) AIR BAG MODULE

(71) Applicant: Key Safety Systems, Inc., Sterling Heights, MI (US)

(72) Inventor: Byron Spencer, Bloomfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/307,635

(22) PCT Filed: Jun. 7, 2017

(86) PCT No.: PCT/US2017/036250
§ 371 (c)(1),
(2) Date: Dec. 6, 2018

(87) PCT Pub. No.: WO2017/214214
PCT Pub. Date: Dec. 14, 2017

(65) Prior Publication Data
US 2019/0344744 A1  Nov. 14, 2019

Related U.S. Application Data

(60) Provisional application No. 62/348,358, filed on Jun. 10, 2016.

(51) Int. Cl.
*B60R 21/203* (2006.01)
*B60R 21/2165* (2011.01)
(Continued)

(52) U.S. Cl.
CPC ........ *B60R 21/2035* (2013.01); *B60R 21/201* (2013.01); *B60R 21/2037* (2013.01);
(Continued)

(58) Field of Classification Search
CPC .......... B60R 21/2035; B60R 21/21658; B60R 21/217; B60R 2021/2172; B60R 21/2037;
(Continued)

(56) References Cited

U.S. PATENT DOCUMENTS 5,685,557 A * 11/1997 Persson ................. B60R 21/203
  280/728.2
6,481,745 B2 * 11/2002 Ford ..................... B60Q 5/003
  200/61.54

(Continued)

FOREIGN PATENT DOCUMENTS

EP  1415869  5/2004
EP  1527963  5/2005
(Continued)

*Primary Examiner* — Paul N Dickson
*Assistant Examiner* — Joselynn Y Sliteris
(74) *Attorney, Agent, or Firm* — Meunier Carlin & Curfman LLC

(57) ABSTRACT

An assembly includes a housing (12) and a cover (20) that define a cavity (15). An air bag (22) is positioned in the cavity (15), and the cover (20) has hooks (46) that engage with the housing (12) to secure the cover (20) to the housing (12). The air bag (22) expands to absorb kinetic energy of a driver. The hooks (46) are energized into engagement with the housing (12) directly or indirectly by the air bag (22) as it expands.

17 Claims, 11 Drawing Sheets

(51) Int. Cl.
*B60R 21/217* (2011.01)
*H01H 13/04* (2006.01)
*H01H 13/14* (2006.01)
*B60R 21/201* (2011.01)

(52) U.S. Cl.
CPC ...... *B60R 21/217* (2013.01); *B60R 21/21658* (2013.01); *H01H 13/04* (2013.01); *H01H 13/14* (2013.01); *B60R 2021/2172* (2013.01); *H01H 2203/008* (2013.01)

(58) Field of Classification Search
CPC ...... B60R 21/201; H01H 13/04; H01H 13/14; H01H 2203/008
See application file for complete search history.

(56) References Cited

U.S. PATENT DOCUMENTS

| | | | | |
|---|---|---|---|---|
| 6,612,607 | B1* | 9/2003 | Takahashi | B29C 45/0081 280/728.2 |
| 6,682,093 | B2* | 1/2004 | Tajima | B60R 21/201 280/728.2 |
| 6,688,637 | B2* | 2/2004 | Igawa | B60Q 5/003 200/61.54 |
| 6,802,531 | B2* | 10/2004 | Bohn | B60Q 5/003 280/728.2 |
| 7,357,409 | B2* | 4/2008 | Frisch | B60Q 5/003 200/61.54 |
| 7,490,852 | B2* | 2/2009 | Marotzke | B60Q 5/003 280/731 |
| 7,540,530 | B2* | 6/2009 | Helmstetter | B60R 21/2037 280/728.1 |
| 7,823,908 | B2* | 11/2010 | Matsu | B60R 21/2037 280/728.2 |
| 7,874,575 | B2* | 1/2011 | Fukuyama | B60R 21/217 280/728.2 |
| 7,946,612 | B2* | 5/2011 | Chevalier | B60Q 5/003 200/61.54 |
| 8,201,847 | B2* | 6/2012 | Hondier | B60Q 5/003 200/61.55 |
| 8,419,048 | B2* | 4/2013 | Yamaji | B60R 21/201 280/728.3 |
| 8,907,235 | B2* | 12/2014 | Chevalier | B60R 21/2037 200/61.54 |
| 9,663,063 | B2* | 5/2017 | Kunitake | B60R 21/237 |
| 9,884,603 | B2* | 2/2018 | Kim | B60R 21/203 |
| 2005/0093279 | A1* | 5/2005 | Hauer | B60R 21/2037 280/740 |
| 2006/0175816 | A1 | 8/2006 | Spencer et al. | |
| 2014/0070520 | A1 | 3/2014 | James et al. | |

FOREIGN PATENT DOCUMENTS

| | | |
|---|---|---|
| EP | 2543554 | 1/2013 |
| JP | 2001233159 | 8/2001 |
| JP | 2002012112 | 1/2002 |
| WO | 2014203683 | 12/2014 |

* cited by examiner

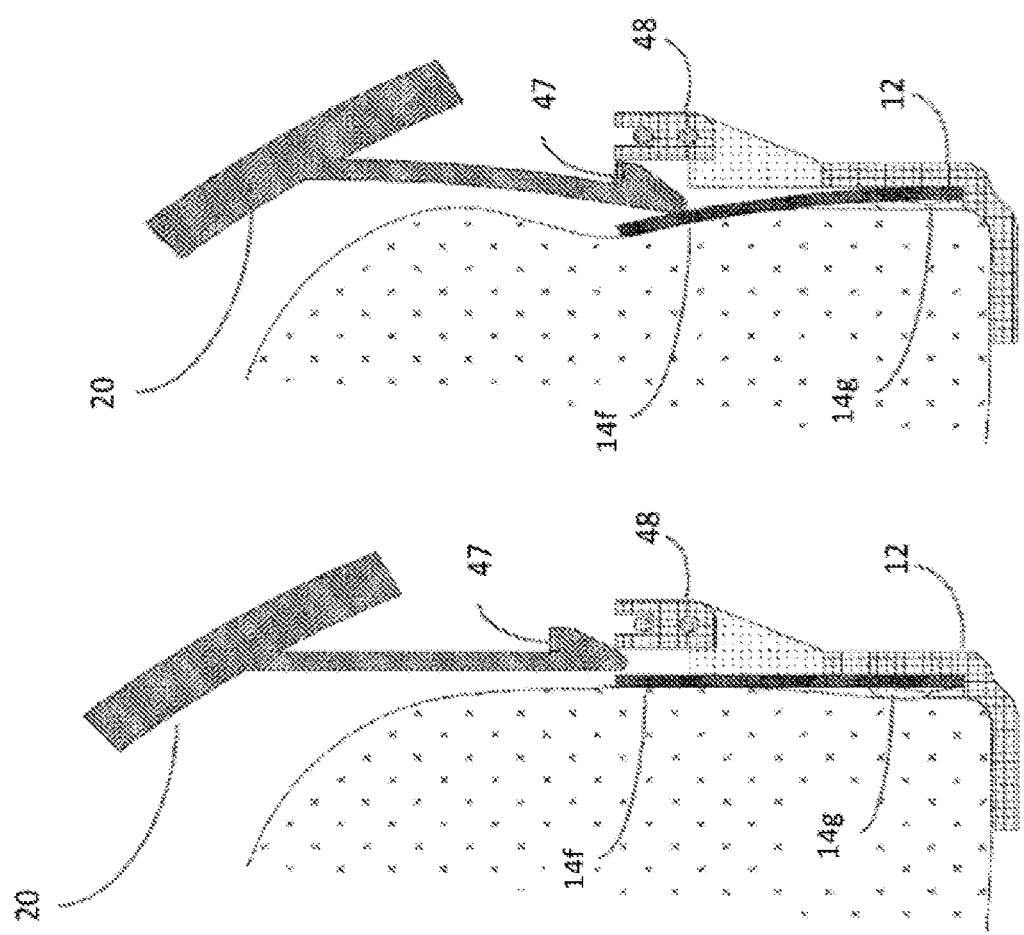

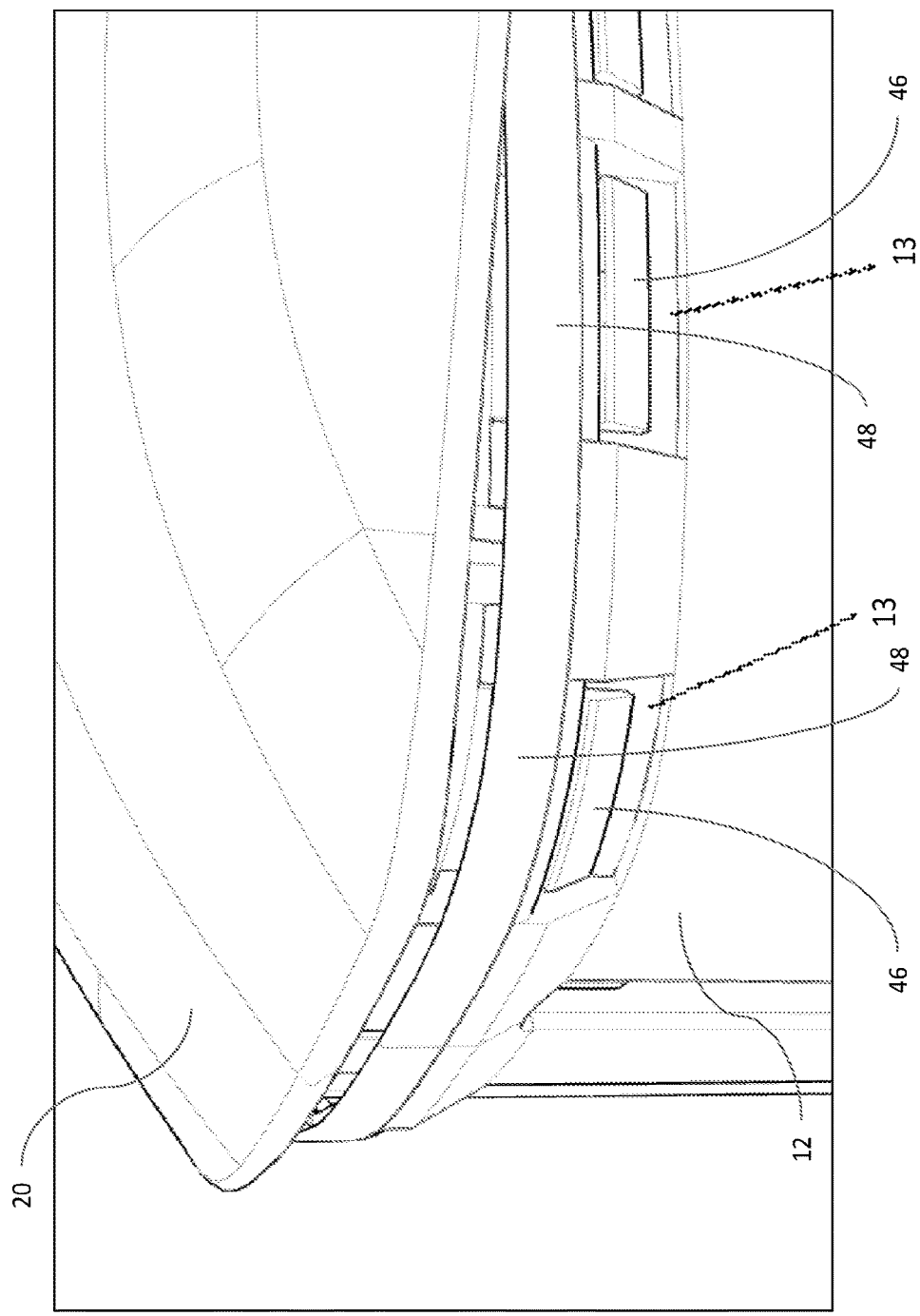

AIR BAG MODULE

FIELD

The present disclosure relates to air-bag modules for motorized vehicles.

BACKGROUND

The statements in this section merely provide background information related to the present disclosure and may or may not constitute prior art.

Generally, motor vehicles are equipped with both driver and passenger air-bag modules, which deploy to protect occupants in the motor vehicles. Some vehicles have knee air-bag modules as well as curtain air-bag modules. The air-bag module is typically activated when the motor vehicle is involved in an accident. Generally, a driver air-bag module is secured to a steering wheel with a spring clip assembly, and a horn switch is positioned between the air-bag module and the steering wheel. A passenger air-bag module is mounted in or near the instrument panel.

SUMMARY

The present invention specifically relates to a driver air-bag module coupled to a steering wheel of a motor vehicle. The air-bag module includes housing and a cover that define a cavity for receipt of an air-bag. The cover has hooks to engage with the housing to secure the cover to the housing while permitting the cover to move relative to the housing to active a horn switch. The horn switch comprises two wires embedded in the housing, at least one of these wires reinforcing the housing. The air-bag expands to absorb kinetic energy of a driver of the motor vehicle during, for example, a frontal crash event. Many of the teachings of this driver air-bag module can be extended to other types of air-bag modules.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are not intended to limit the scope of the present disclosure in any way. The components in the figures are not necessarily to scale, emphasis instead is placed upon illustrating the principles of the invention. In the drawings:

FIGS. 3B-3D are partial cross-sectional views of the air-bag module illustrating the attachment of a cover to a housing;

FIG. 6A is a partial view of the cover attached to the housing;

DETAILED DESCRIPTION

The following description is merely exemplary in nature and is not intended to limit the present disclosure, application, or uses.

Figure 1A:
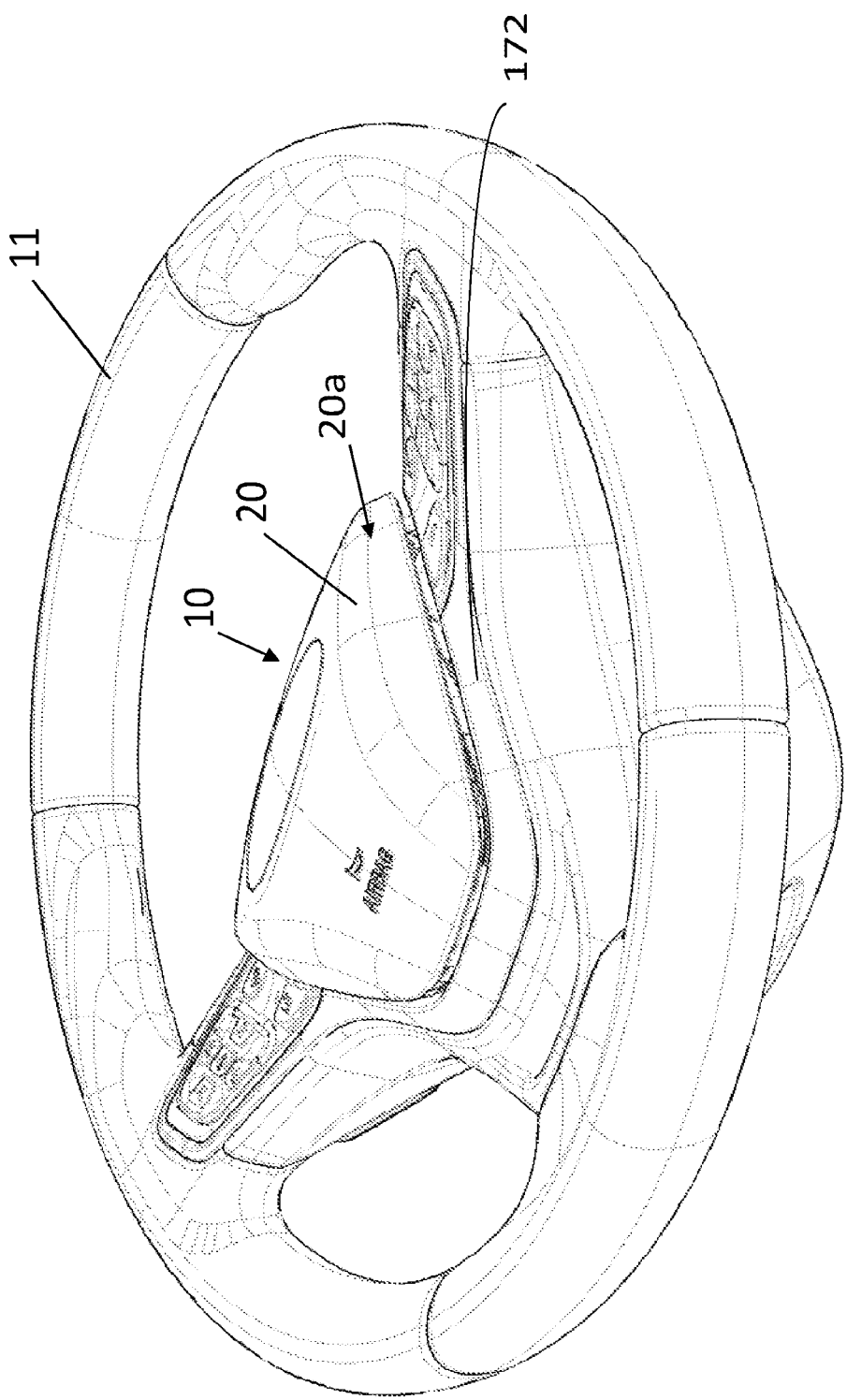
FIG. 1A is a perspective view of a steering wheel with an air-bag module in accordance with the principles of the present invention.
Figure 1B:
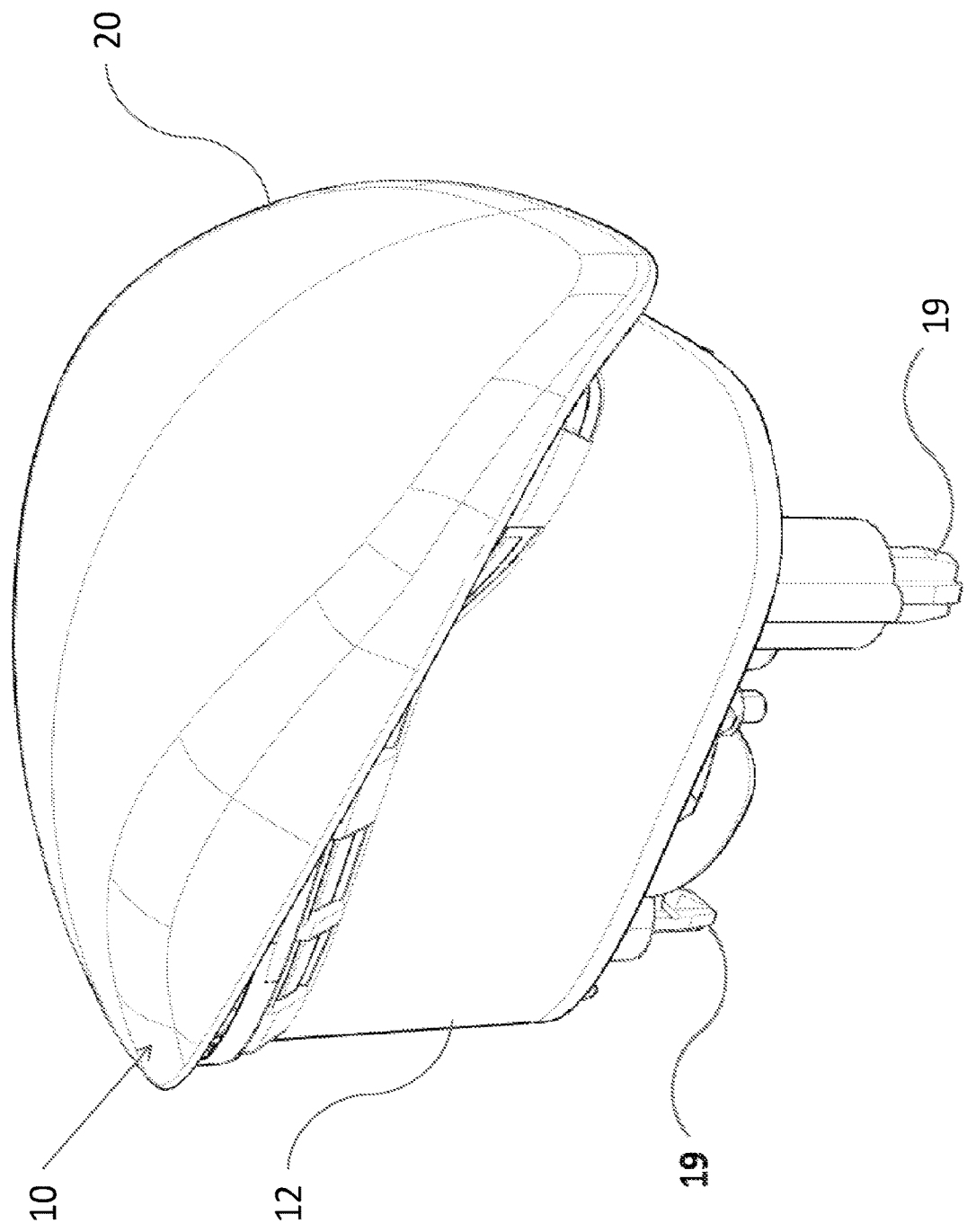
FIG. 1B is a perspective view of the air-bag module.
Figure 2:
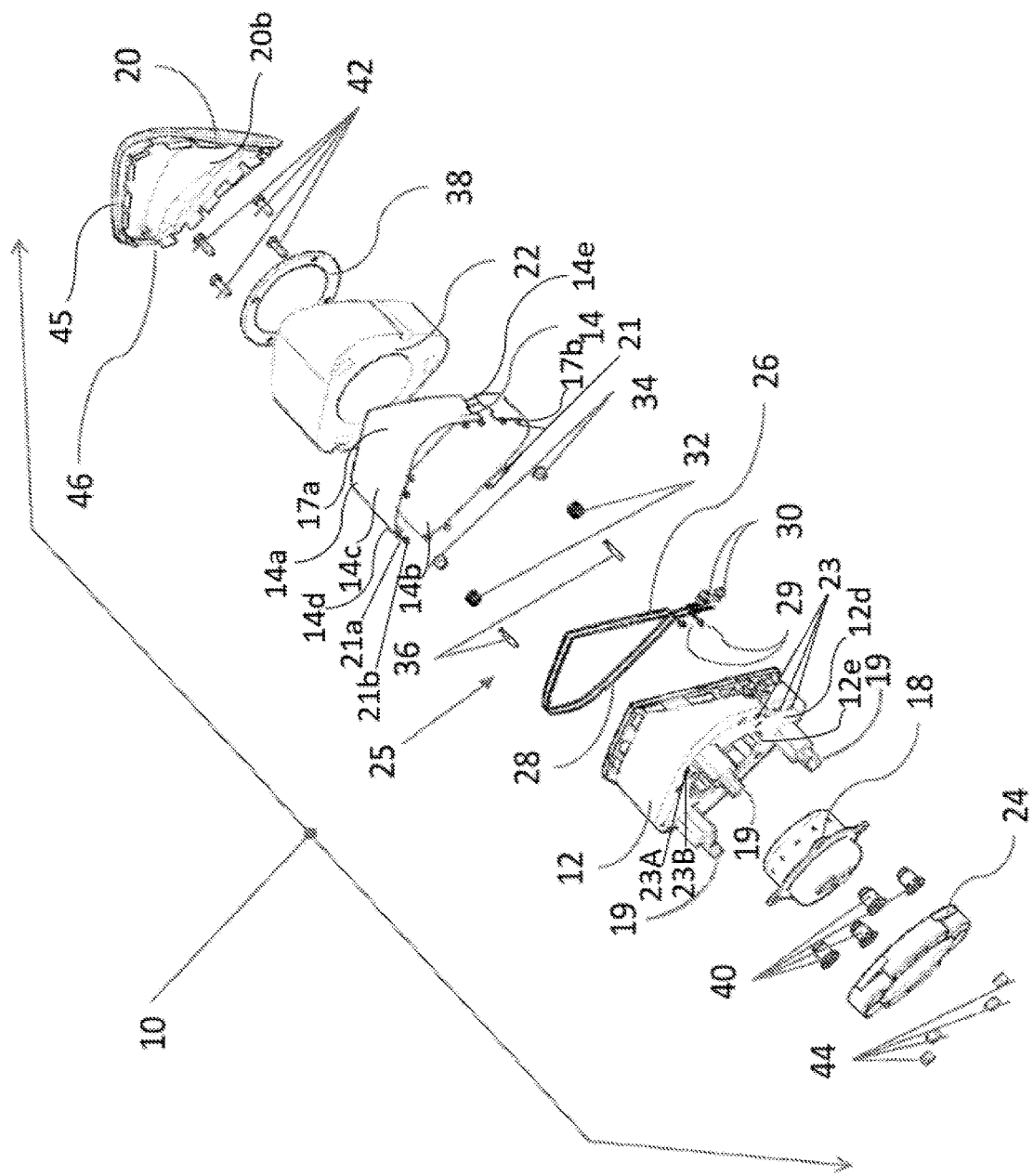
FIG. 2 is an expanded view of the air-bag module in accordance with the present invention.

With reference to FIGS. 1-5, an air-bag module 10 is shown for use with a steering wheel 11 of a motor vehicle. The air-bag module 10 includes a housing 12, a shield 14, a cover 20, a cushion or air-bag 22 and a horn switch 25 with an upper wire 26 and a lower wire 28. The housing 12 can take on many shapes. In FIG. 2 the housing 12 is triangularly shaped with sides 12a, 12b and 12c. The height of each side varies with many factors such as the shape and height of adjacent portions of the steering wheel 11. Housing 12 also includes a bottom 12d with a center opening 12e into which an inflator 18 is placed and secured in a known manner. Positioned on the bottom 12d and about the opening 12e is a cage 120; the cage has a raised side 122 with a plurality of cutouts or openings 124. The cage 120 includes a top 126 with a plurality of openings 128. Openings 124 are rectangular or square shaped while openings 128 are triangular shaped. The inflator 18 is mounted within the cage and the air-bag is placed about the cage. The bottom 12d of the housing 12 includes a plurality of openings 23 in the form of narrow slits into which a corresponding leg 21 of the shield 14 is placed.

The shape of the shield 14 is, in general, complementary to the shape and height of the housing 12. As can be seen in FIG. 2, the shield 14 has a generally triangular shape. In the illustrated embodiment the shield 14 is formed of two substantially identical parts 14a and 14b. Depending upon the shape of the housing the shield can be one-piece. Each shield part 14a, 14b has a long side 14c and short sides 14d and e. Adjacent sections 14c-14e and 14c-14d are separated by a respective curved portion 17a or 17b. This relationship mimics the shape of the housing 12. A lower edge of each shield part 14a,b includes a plurality of legs 21. Each leg 21 includes a narrow portion 21A and an enlarged portion 21B. Each slit 23 includes an enlarged portion 23A and narrow portion 23B extending toward a side of the bottom of the housing. To secure each shield part 14a,b in place the entire leg 21 is placed in a corresponding slot 23 with the enlarged portion 21B positioned below the bottom 12e of the housing 12 and then the shield and each respective leg 21 is moved outward so the enlarged portion 21B is moved below the adjacent narrow portion 23B of the slit 23 with the narrow portion 21A of the leg 21 seated in the narrow portion 23B of the slit. In this manner the bottom of each shield part 14a,b is secured to the housing 12. The shield can be secured to the housing in a number of ways, for example using rivets or having the lower portions of each shield part welded to the housing. The shield can be formed as a part of the housing as the housing is molded.

Figure 4:
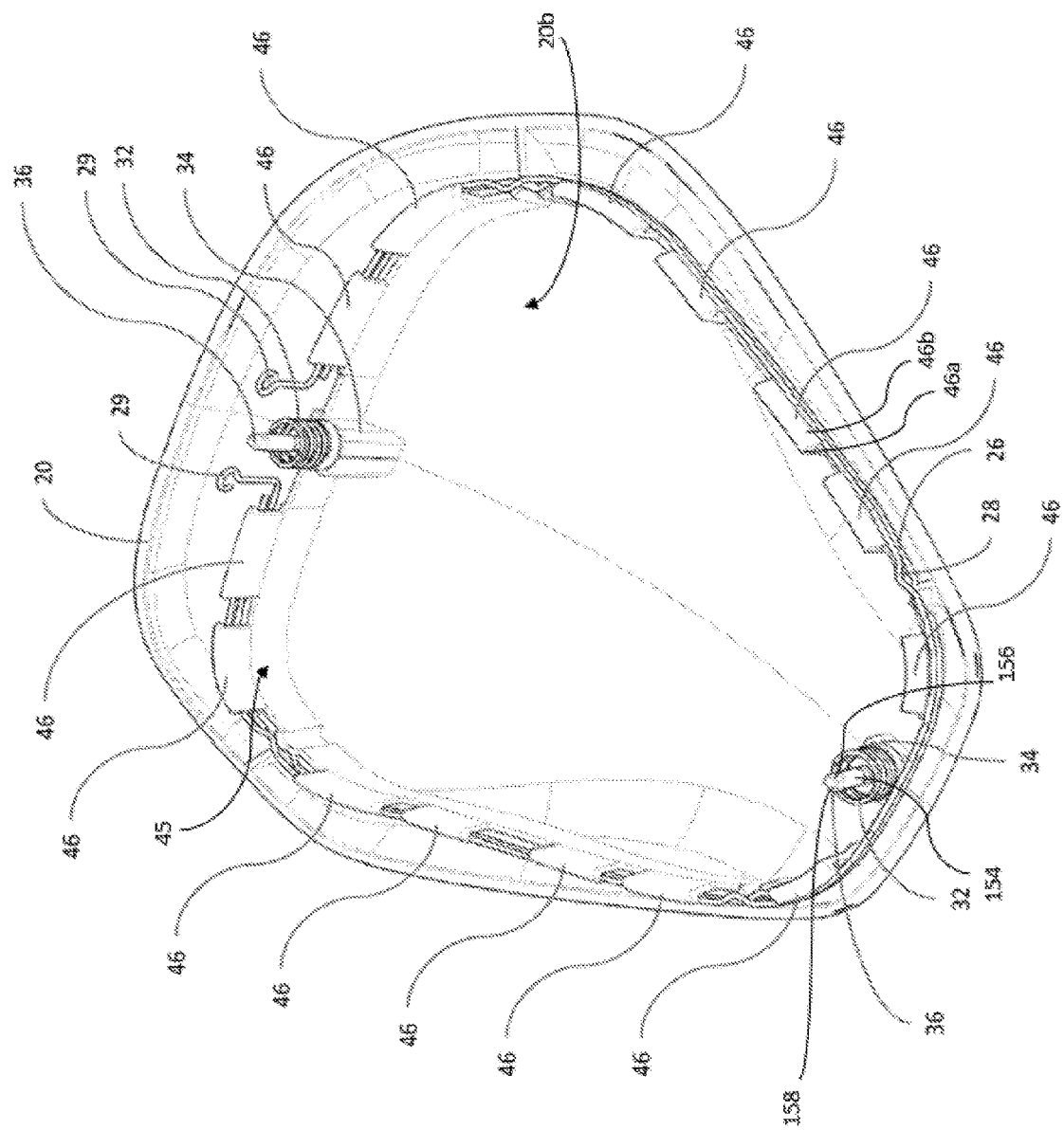
FIG. 4 is a perspective view of the cover with at least a portion of a horn switch.
Figure 5:
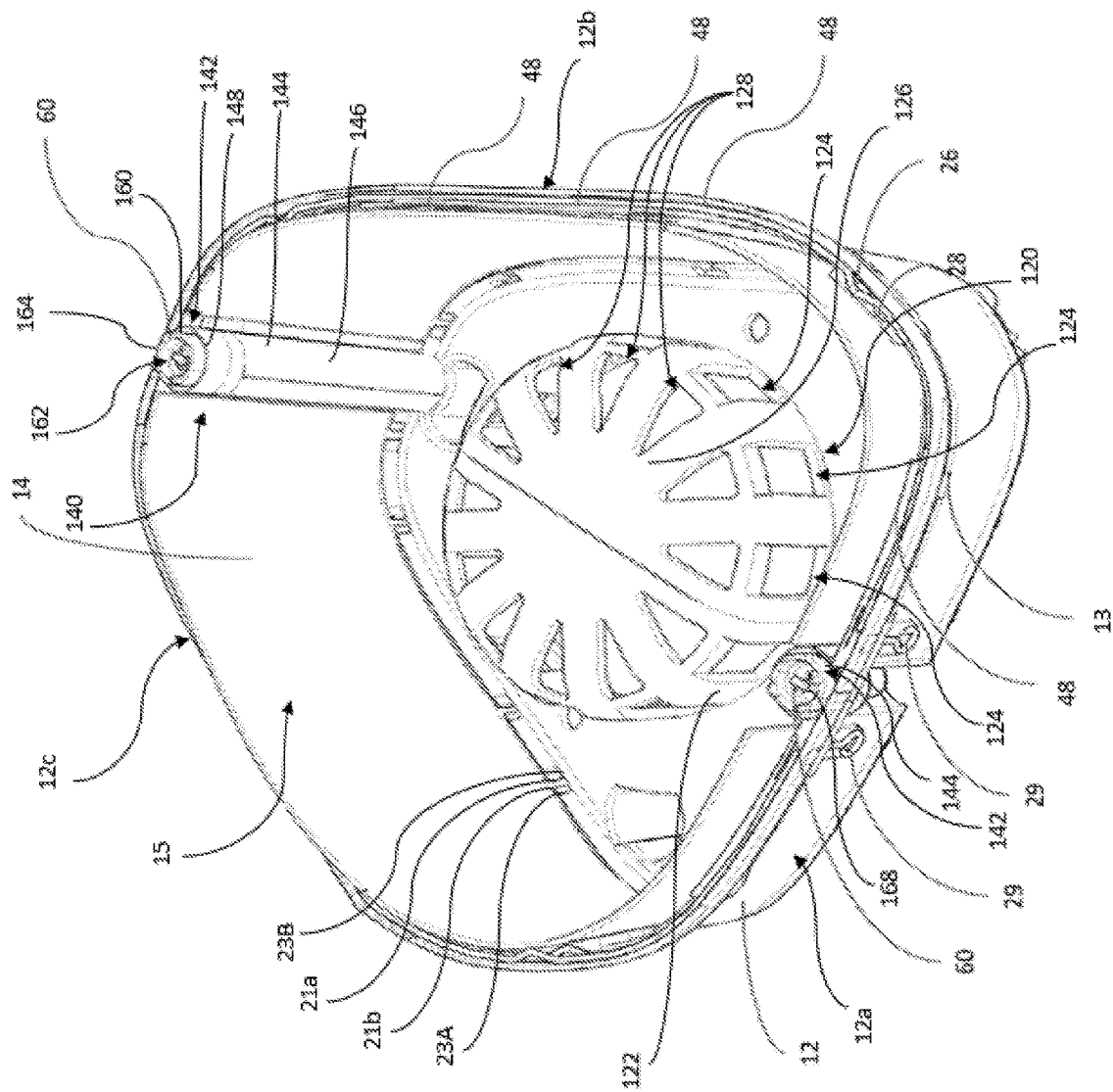
FIG. 5 is a perspective view of the housing with at least a portion of a horn switch.

Reference is made to FIG. 5 which is an orthogonal view of the interior of the module housing 12. The housing includes two cylindrical structures 142 which are part of the interior wall of sides 12a, b, and c of the housing 12 and function as an interior spring housing wall, each of which is part of one of two spring assemblies 140. As can be seen the two shield parts 14a,b lie against the inside wall of the housing 12 and have ends positioned adjacent the two cylindrical structures 142. The spring assembly 140 includes a cylindrical housing 144 located outside of the cylindrical structure 142. This relationship is shown in FIG. 5. Housing 144 has a cylindrical lower portion 146 and a larger diameter upper portion 148. The lower portion 146 functions as a support for a mounting pin 36. The pin 36 can be press fit or screwed into portion 144. The upper portion 148 supports a cover mounting spring 32. Pin 36 has a large diameter portion 154, a narrow pin portion 156 and a flat rectangularly shaped portion 158. Portion 158 can also be seen in FIG. 4. A spring retainer 160 secures spring 32 to the pin 36. The spring 32 fits into a cup-like cavity 162 formed by the upper portion 148. The upper portion 148 includes an annular projection 164 which centers the spring 32. The retainer 160 includes a rectangular slit 168 slightly larger than the size of the flat portion 158 of the pin 36. With the spring 32 in place, the retainer 160 is placed above the spring 32 and flat portion 158 with the slit 168 aligned to the flat portion 158. The retainer 160 is pressed down, compressing the spring 32 so that the flat portion 158 of the pin 36 is freely within the retainer 160. The retainer 160 is rotated 90 degrees to hold the retainer 160, spring 32, and pin 36 together. Numeral 172 is a portion of the trim on the steering wheel located near the housing 12 and cover 20.

Figure 3A:
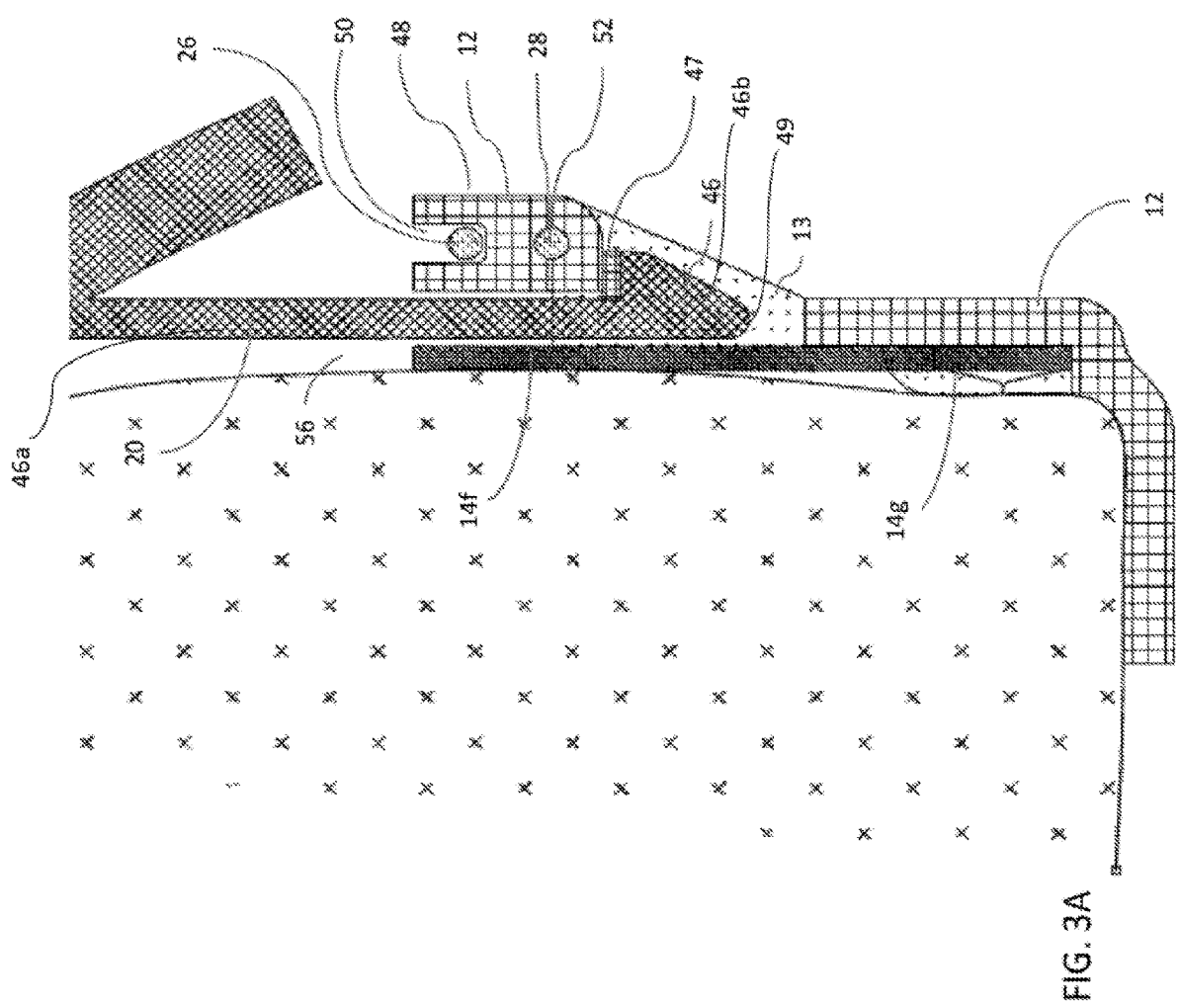
FIG. 3A is a partial cross-sectional view of the air-bag module.
Figure 3D:
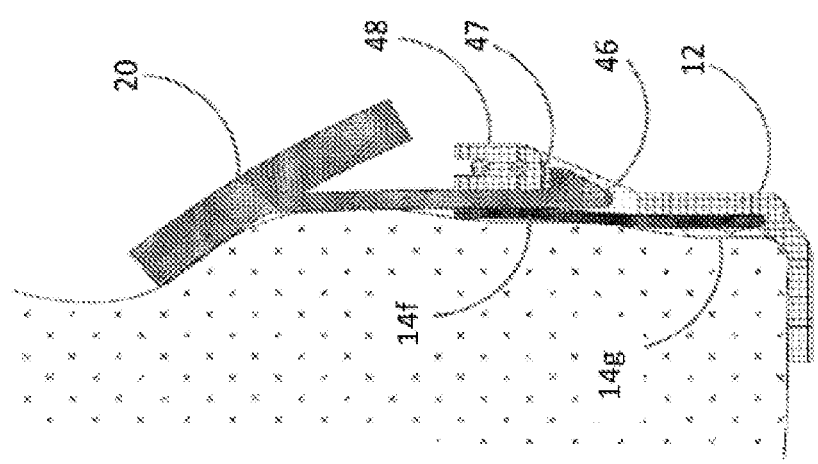

The housing 12 and the cover 20 define a cavity 15 for receipt of the air-bag 22. The air-bag 22 is folded or otherwise formed into a compact configuration prior to or as it is being placed into the housing 12; the cover 20 is then position upon the housing 12. The horn switch 25 of the present invention is positioned between the housing 12 and the cover 20. As shown in FIGS. 2 and 3A and other figures, the shield 14 includes a free flexible portion 14f and a fixed portion 14g attached to the housing 12. The assembly of the cover 20 and the horn switch 25 to the housing 12 are described in greater detail below. The housing 12 includes at least one attachment mechanism 19, such as, for example, a conically shaped tip, clip, hook or flange, which are operable to couple the air-bag module 10 to a steering wheel armature with a spring clip mechanism as is known in the art.

The air-bag module 10 further includes an inflator 18, a damper (optional) 24 and retainer ring 38. When the air-bag module 10 is assembled, a set of studs 42 extends through the retainer ring 38, the inflator 18, a set of damper springs 40 positioned between the inflator 18 and the damper 24, and the damper 24 itself. A set of nuts 44 are tightened onto the set of studs 42 to secure the components of the air-bag module 10 together.

The cover 20 is operable to protect the air-bag 22. As illustrated the cover 20 includes a top 20a which is generally triangular to match with the general shape of the housing 12. As is known in the art the housing 12 and cover 20 can have any desired shape. Extending from the undersurface 20b of the cover 20 is a wall 45 and a plurality of hooks 46 extend from the wall. Portions of the top 20a extend radially outward from the wall. The housing 12 and cover 20 are formed with counterpart locking formations such as a hook and eye (or opening). Each hook 46 has an extending flexible leg 46a which terminates in a hook or catch formation 46b. As can be seen from FIGS. 2 and 4, the length of the leg 46a and hook 46b is relatively short which reduces the mass of the cover 20. This is important in that the cover 20 of the present invention is given limited resilient travel towards and away from the housing 12. In essence the cover 20 floats relative to the housing 12 and air-bag 22. Portions of the cover 20 are used to activate the horn switch 25 of the present invention. By making the cover 20 lightweight, the force needed to activate the horn switch 25 is reduced. As can be seen in FIG. 2 and other figures the housing 12 includes a plurality of openings 23. The cover 20 is generally made from a polymeric material, such as polyester (TPE), but any other suitable material can be employed. In certain arrangements, the shield 14 is die cut from a sheet of plastic, and the air-bag 22 in its compact shape is wrapped in in a tearable material, muslin or some non-woven material and contained in the cavity 15 and partially surrounded by the shield 14 for further protection of the air-bag 22.

Figure 7:
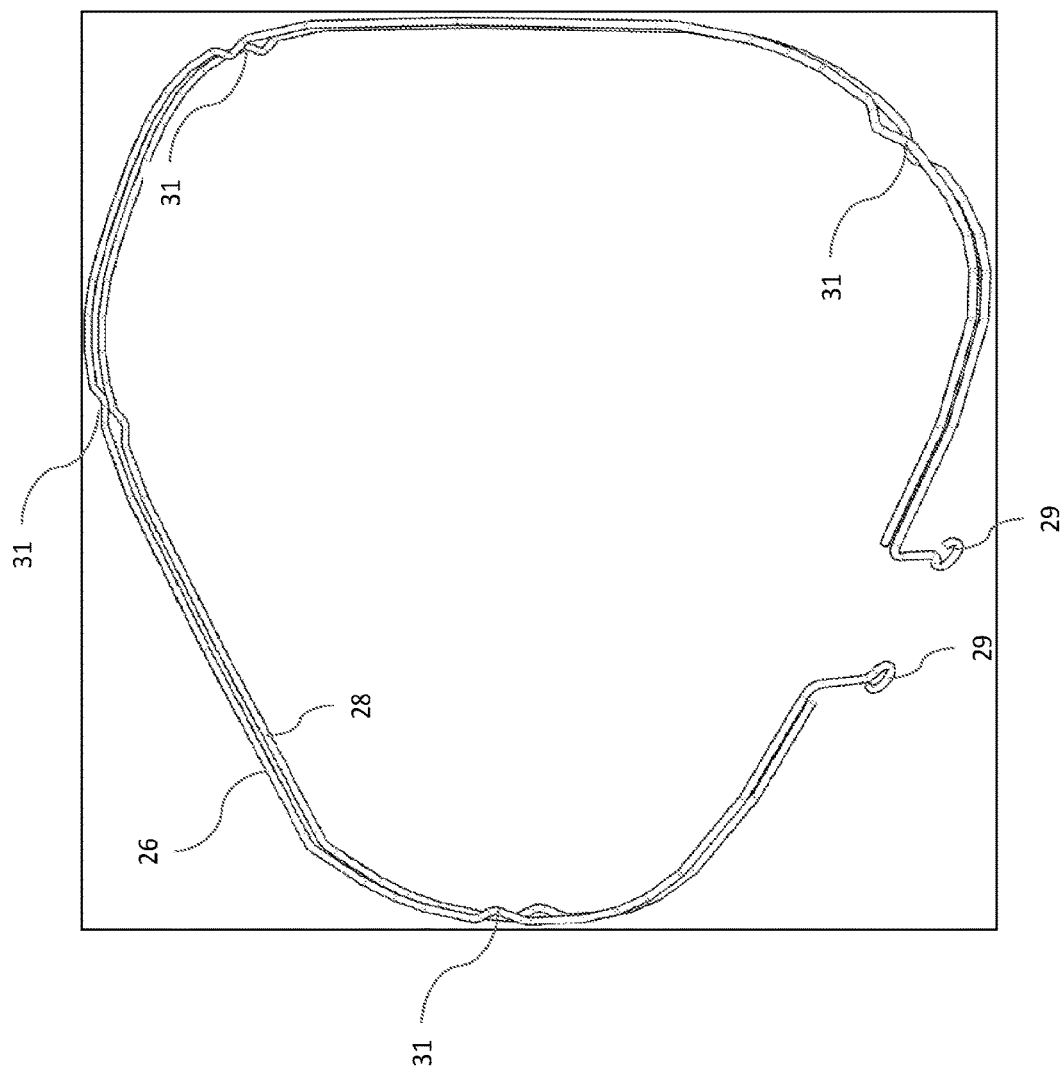
FIG. 7 is a perspective view of the horn switch.

The wires 26 and 28 can be formed from any suitable conductive material such as, for example, a high carbon steel alloy wire sometimes referred to as "music wire." As such, the wires 26 and 28 are arranged as movable electrical conductors and are configured so that when in engagement, the wires 26 and 28 are capable of crossing or contacting in a plurality of locations 31 (FIG. 7) forming electrical contacts or contact points to close the electric circuit of the horn switch 25. When the two wires 26 and 28 are employed in the horn switch 25, the plurality of contact points 31 accommodate normal usage of a motor vehicle horn in which the driver may press upon the air-bag cover 20 at one of many different points, each of which causes at least one contact 31 to be closed. As can be appreciated, the driver of the vehicle might press upon the center of the cover 20 or at its top, bottom, sides, etc. to activate the horn.

Respective ends 29 of each of wire 26, 28 are adapted to be connected to one or more electrical connectors to form a terminal assembly 30 (see FIG. 2). The terminal assembly 30 provides communication of the horn switch 25 with an electrical control unit (not shown), which communicates a horn activation signal, produced upon contact of the wires 26, 28, to a horn.

With reference to FIGS. 4 and 5, the cover 20 includes a set of locator openings 34 and the housing 12 includes a set of locator openings 60. A guide pin 36 is secured to a respective locator opening 34. Upon assembly each pin 36 extends into a locator opening 60 to center the cover 20 onto the housing 12. A set of springs 32 is positioned between the cover 20 and the housing 12 to create a bias force that pushes the cover 20 and the housing 12 apart such that the cover 20 floats on the housing 12.

Figure 6B:
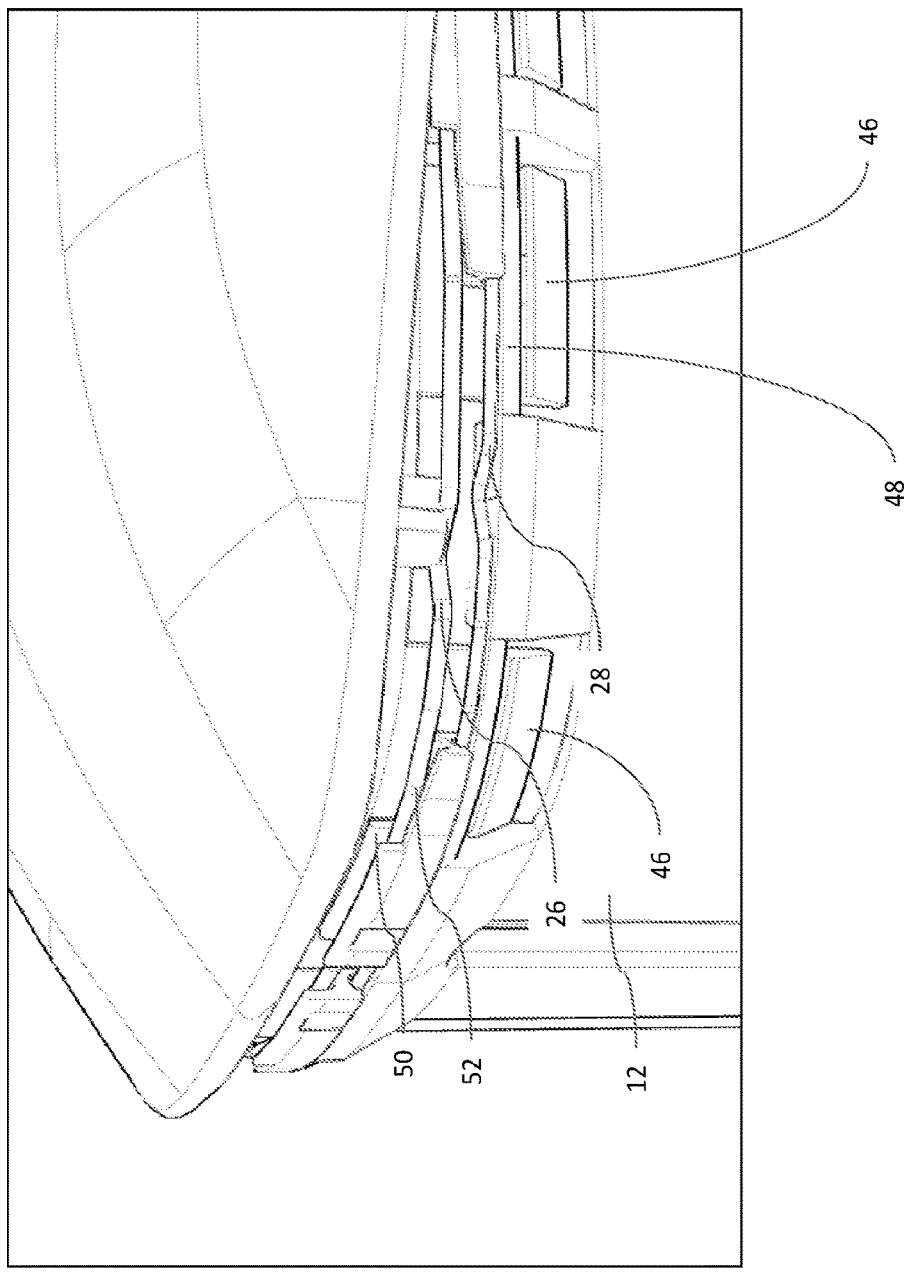
FIG. 6B is a partial view of the cover attached to the housing illustrating a portion of the horn switch.

Referring also to FIGS. 3A, 6A and 6B, each of the hooks 46 is inserted into an open region 13 of the housing 12. The housing 12 includes a rail 48. This rail 48 is formed as a laterally extending shoulder as shown in FIGS. 2, 5 and others. At least three or more respective pads 47 engage with a rail 48 of the housing 12 to control the axial position of the cover 20 with respect to the housing 12. The details of this relationship are discussed below. The upper wire 26 is positioned in a trench 50 of the rail 48, and the lower wire 28 is insert molded in an opening 52 formed in the rail 48 during molding. Accordingly, the arrangement of the wires 26 and 28 around the rail 48 provide structural reinforcement to the wall of the housing 12.

The position of the shield 14 and the hooks 46 when engaged with the rail 48 define a space or gap 56. During the assembly of the cover 20 to the housing 12, an inclined distal end 49 of each hook 46 initially makes contact with a top corner of the rail 48 as shown in FIG. 3B. Note that the space or gap 56 ensures that the hooks 46 do not push down on the top of flexible portion 14f. Downward force on the cover 20 and the inclination of the distal end 49 causes the hooks 46 to flex inwardly against the flexible portion 14f of the shield 14, as shown in FIG. 3B. The inward motion of each inclined distal end 49 causes an adjacent portion of the flexible portion 14f to flex inwardly as well. Further downward movement of the cover 20 allows the hooks 46 to flex outwardly so that the pads 47 engage under the rail 48. The pads 47, on hooks 46 are widely spaced among the multitude of hooks 46 to establish a stable "A" datum plane for the rest position of the cover 20. The location "B DATUM" and angular orientation "C DATUM" locators previously described completely define a single unique position for the cover 20 with respect to the housing 12. During deployment, strain in the cover 20 engages all hooks 46 to keep the cover 20 in place as the air-bag 22 inflates to rupture the cover 20 and exit the housing 12 and cavity 15 through doors in the cover 20 defined by pre-established tear seams and hinges. Note that during the deployment of the air-bag module 10 (that is, when the air-bag 22 inflates), the air-bag 22 pushes laterally outwards against the shield 14. The flexible portion 14f of the shield in turn flexes outwardly against the hooks 46, which secures the retention of the hooks 46 by the rail 48. Hence, the cover 20 is attached to the housing 12 by hooks 46 that are urged to stay in engagement by the resistance of the shield 14 as the air-bag 22 inflates. The shield 14 secondarily keeps the air-bag 22 from hindering movement of the cover 20 as it operates the horn.

The description of the invention is merely exemplary in nature and variations that do not depart from the gist of the invention are intended to be within the scope of the invention. Such variations are not to be regarded as a departure from the spirit and scope of the invention.

What is claimed is:

1. An assembly comprising:
   a housing;
   a cover with hooks that engage with the housing, the cover and the housing defining a cavity;
   an air bag positioned in the cavity, the air bag being operable to expand to absorb kinetic energy of a driver; and
   a shield separately formed from the housing and airbag and disposed within the cavity, wherein an edge of the shield closest to the cover defines an opening through which the air bag expands when actuated;
   wherein the shield is positioned between the air bag and the housing;
   wherein the shield includes a flexible portion that deflects as the hooks engage with the housing during the assembly of the cover to the housing and during deployment of the air bag.

2. The assembly of claim 1 further comprising a horn switch positioned between the cover and the housing.

3. The assembly of claim 2 wherein the horn switch includes a first wire and a second wire spaced apart a distance from the first wire, and wherein when either the first wire or the second wire is displaced the distance towards the other wire to engage the other wire, the engagement between the first wire and the second wire generates an electrical signal to activate a horn.

4. The assembly of claim 3 wherein the housing includes a rail with a trench, and the first wire resides in the trench.

5. The assembly of claim 4 wherein the second wire is insert molded within an opening in the rail.

6. The assembly of claim 4 wherein the hooks engage with the rail to secure the cover to the housing.

7. The assembly of claim 1 wherein the shield is made of a plastic.

8. The assembly of claim 1 wherein the shield absorbs energy from the air bag during deployment of the air bag, the absorption of the energy urging the shield against the hooks, ensuring that the hooks remain engaged with the housing during deployment of the air bag.

9. The assembly of claim 1 wherein the housing and the cover each includes at least one locater, and the assembly further includes at least one pin that inserts into the at least one locator to center the cover with the housing.

10. The assembly of claim 9 further comprising at least one spring positioned about a respective pin and between the cover and the housing, the at least one spring providing a biasing force that urges the cover away from the housing such that the cover floats over the housing.

11. An air bag module comprising:
    a housing;
    a cover with hooks that engage with the housing, the housing and the cover defining a cavity;
    an air bag positioned in the cavity;
    an inflator that inflates the air bag to expand to absorb kinetic energy of a driver; and
    a shield separately formed from the housing and airbag and disposed within the cavity, wherein an edge of the shield closest to the cover defines an opening through which the air bag expands when actuated;
    wherein the housing includes a rail, the hooks engaging with the rail to secure the cover to the housing.

12. The air bag module of claim 11 further comprising a horn switch with a first wire and a second wire spaced apart from the first wire, the horn switch being positioned between the housing and the cover.

13. The air bag module of claim 11 wherein the shield is positioned between the air bag and the housing, the shield absorbing energy from the air bag during deployment of the air bag, absorption of the energy ensuring that the hooks remain engaged with the housing during deployment of the air bag.

14. A horn switch assembly comprising:
    an air bag housing with a rail, the rail having a trench;
    a first conductive member positioned in the trench; and
    a second conductive member spaced apart from the first conductive member and insert molded in the rail,
    wherein the first conductive member is movable from a disengaged position to an engaged position, the first conductive member and the second conductive member being in electrical contact when the first conductive member is in the engaged position to generate an electrical signal to activate a horn.

15. The horn switch assembly of claim 14 wherein the first and second conductive members are first and second wires, respectively.

16. The horn switch assembly of claim 14 wherein the first conductive member and the second conductive member provide structural reinforcement to the housing.

17. The horn switch assembly of claim 14 wherein the second conductive member is insert molded in the rail except at predetermined locations, the first conductive member and the second conductive member being in electrical contact at these predetermined locations when the first conductive member is in the engaged position.

* * * * *